(12) United States Patent
Bauchspies

(10) Patent No.: US 7,512,256 B1
(45) Date of Patent: Mar. 31, 2009

(54) SYSTEM, METHOD, AND COMPUTER PROGRAM PRODUCT FOR RIDGE MAP FORMATION

(75) Inventor: Roger A. Bauchspies, Belmont, CA (US)

(73) Assignee: ODI Security; LLC, Mountain View, CA (US)

( * ) Notice: Subject to any disclaimer, the term of this patent is extended or adjusted under 35 U.S.C. 154(b) by 757 days.

(21) Appl. No.: 10/897,310

(22) Filed: Jul. 22, 2004

(51) Int. Cl.
*G06K 9/00* (2006.01)

(52) U.S. Cl. .................................................... 382/124

(58) Field of Classification Search ......... 382/124–125, 382/190; 283/67–70; 340/5.52, 5.53; 713/186
See application file for complete search history.

(56) References Cited

U.S. PATENT DOCUMENTS

| | | | |
|---|---|---|---|
| 5,845,005 A * | 12/1998 | Setlak et al. ................. | 382/124 |
| 5,909,501 A * | 6/1999 | Thebaud ...................... | 382/124 |
| 5,926,555 A * | 7/1999 | Ort et al. ..................... | 382/124 |
| 6,241,288 B1 * | 6/2001 | Bergenek et al. ............. | 283/67 |
| 7,027,626 B2 * | 4/2006 | Funada ........................ | 382/125 |
| 7,203,347 B2 * | 4/2007 | Hamid ........................ | 382/124 |

* cited by examiner

*Primary Examiner*—Daniel G Mariam
(74) *Attorney, Agent, or Firm*—Michael E. Woods

(57) ABSTRACT

Disclosed is an apparatus, method, and computer program product for ridge map formation. The method for processing an image data structure to extract a feature defined by a plurality of contiguous data elements includes identifying a set of candidate image feature pixels, the set including one or more pixels from the image data structure; examining local image data surrounding one or more pixels of the set of candidate image feature pixels to identify a set of potential image feature pixels with each of the potential image feature pixels having a characteristic consistent with being associated with the feature; and identifying the feature in the image data using the set of potential image feature pixels by locating one or more of the plurality of contiguous data elements neighboring one or more pixels of the set of potential image feature pixels. The computer program product includes instructions executable by a processing unit, and those instructions perform the feature extraction as described herein. The system is an apparatus for processing an image data structure to extract a feature defined by a plurality of contiguous data elements.

49 Claims, 6 Drawing Sheets

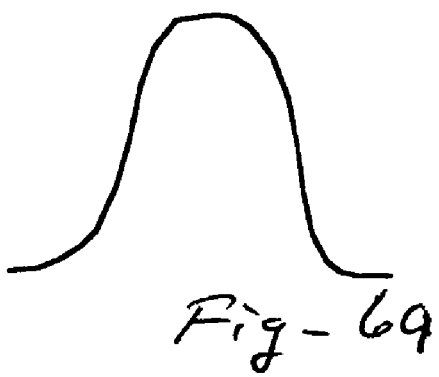
Fig-6a
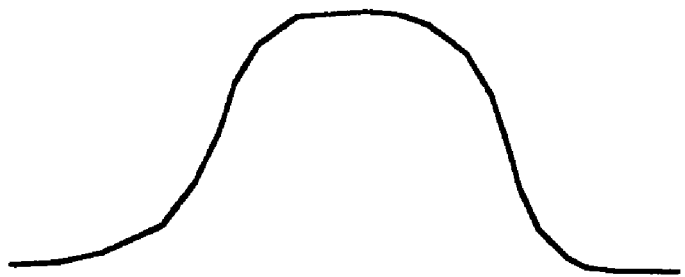
Fig-6b
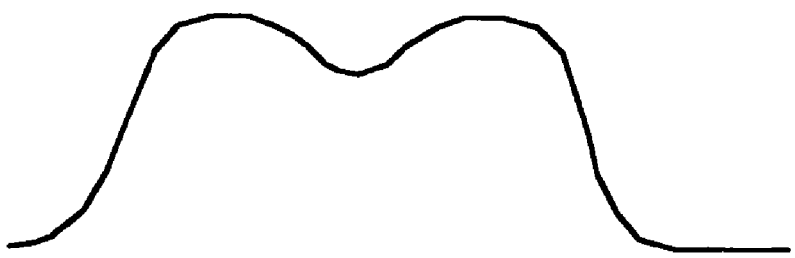
Fig-6c
Fig-6

SYSTEM, METHOD, AND COMPUTER PROGRAM PRODUCT FOR RIDGE MAP FORMATION

CROSS-REFERENCE TO RELATED APPLICATIONS

This patent application is related to co-pending United States patent applications entitled: "SYSTEM, METHOD, AND COMPUTER PROGRAM PRODUCT FOR FINGERPRINT VERIFICATION" having application Ser. No. 10/897,316, and "SYSTEM, METHOD, AND COMPUTER PROGRAM PRODUCT FOR IMAGE COMPRESSION/DECOMPRESSION" having application Ser. No. 10/897,965, both filed on even date and both expressly incorporated by reference in their entireties for all purposes.

BACKGROUND OF THE INVENTION

The present invention relates generally to automatic machine-implemented fingerprint recognition systems, and more specifically to a system, method and computer program product for extracting a feature map from an image.

The use of biometrics as an aid to confirming authorization for access to various types of resources or locations has been increasing. Biometric systems measure various unique or nearly unique characteristics of a person's body to assist in confirming identity, and consequently in authorizing an access requested by the person. Common body characteristics used in these systems include fingerprints and eye retinal patterns.

Fingerprints are believed by many to be unique or nearly unique across the population base. Fingerprints include ridges/furrows that define a complex pattern. Each fingerprint typically includes many pattern features (including features referred to as minutia) that are cognizable by detection systems. These minutia serve as the basis by which many fingerprint biometric systems judge a match between a fingerprint-under-test and a reference fingerprint. That is, when the system determines that there is a sufficient match between the fingerprint-under-test and the reference, the system has determined that there are enough matching minutia between the two.

There are two common metrics used to measure how accurate these systems are when comparing the fingerprint-under-test with one or more reference fingerprints. These metrics are a false acceptance ratio (FAR) and a false rejection ratio (FRR). These metrics are dependent upon many factors including the implementation of the sensing system and the type of fingerprint features measured. In general, the FAR and the FRR of conventional systems are inversely related resulting in balancing the performance of these systems, and limiting the practicably achievable accuracy.

Further, processing multitudes of minutia information for multiple fingerprints using conventional systems requires significant processing resources and are often still viewed as taking excessive amounts of time. The significant processing resources needed relegate many solutions to systems that are tethered to desktop computer systems or other substantial processing system. However, there exist many uses for these systems that cannot be used in conjunction with desktop computer systems.

Various systems exist for compression of data to enable the data to be stored using fewer resources (e.g., memory or disk storage) or to enable the data to be transmitted quicker. There are both lossless and lossy systems that may be used based upon characteristics of the implementation. Lossless systems include variable-length encoding systems that, in general application, have a theoretical limit to the degree of compression.

Typically, prior art systems receive a "picture" of a fingerprint, and then perform a fast Fourier transform (FFT) followed by a thinning process to generate a ridge map from the picture. The picture is typically a grayscale image of a pattern of ridges and furrows. The FFT and thinning create a binary data file that attempts to reproduce the pattern in a format for computer computation and processing. Unfortunately, FFT and ridge thinning are typically computationally intense, which has a direct impact upon the responsiveness of a fingerprint verification system.

What is needed is a system offering improved ridge map formation using the often more limited processing resources of a stand-alone or embedded computing platform while desirably being cost-effective.

BRIEF SUMMARY OF THE INVENTION

Disclosed is an apparatus, method, and computer program product for ridge map formation. The method for processing an image data structure to extract a feature defined by a plurality of contiguous data elements includes identifying a set of candidate image feature pixels, the set including one or more pixels from the image data structure; examining local image data surrounding one or more pixels of the set of candidate image feature pixels to identify a set of potential image feature pixels with each of the potential image feature pixels having a characteristic consistent with being associated with the feature; and identifying the feature in the image data using the set of potential image feature pixels by locating one or more of the plurality of contiguous data elements neighboring one or more pixels of the set of potential image feature pixels. The computer program product includes instructions executable by a processing unit, and those instructions perform the feature extraction as described herein. The system is an apparatus for processing an image data structure to extract a feature defined by a plurality of contiguous data elements.

The preferred embodiment of the present invention is a pattern map formation system, method, and computer program product offering improved processing efficiency due to reduced size requirements using the often more limited processing resources of a stand-alone or embedded computing platform while desirably being cost-effective.

The novel features which are characteristic of the invention, as to organization and method of operation, together with further objects and advantages thereof, will be better understood from the following description considered in connection with the accompanying drawings in which one or more preferred embodiments of the invention are illustrated by way of example. It is to be expressly understood, however, that the drawings are for the purpose of illustration and description only and are not intended as a definition of the limits of the invention. These drawings include the following figures, with like numerals indicating like parts.

BRIEF DESCRIPTION OF THE DRAWINGS

FIG. 6 is a set of representative ridge cross-sections, including FIGS. 6a., 6b., and 6c. showing typical ridge cross sectional areas as represented in numerical data as seen by subprocess 205 shown in FIG. 2;

DETAILED DESCRIPTION OF THE INVENTION

The present invention relates to a system, method, and computer program product offering improved image compression and processing efficiency due to reduced size requirements using the often more limited processing resources of a stand-alone or embedded computing platform while desirably being cost-effective. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

For purposes of the present discussion of a fingerprint verification process in which a fingerprint-under-test is compared against a set of candidate fingerprints, with a comparison signal produced based upon the results of any comparisons, the term fingerprint is taken in its broadest sense. Fingerprint includes a map of contrasting amplitude element and as such, the ridge/furrow pattern on human fingers is included as a fingerprint. Additionally, zebra stripe patterns, retinal vein patterns, or other map of contrasting elements having sufficiently long elements and points of interest coupled to these elements.

Also, to simplify the present discussion, the discussion will emphasize how to make and use, as well as the best mode, of a fingerprint verification engine/process for use in an embedded system. The nature, type and implementation details of the embedded system are not discussed in much detail as the preferred embodiment may be adapted for use in a very wide range of systems. The embedded system determines when to test a fingerprint, when to write/remove reference fingerprints into/from nonvolatile memory, what level of correspondence between a test fingerprint and a reference fingerprint is required, and what happens with a comparison signal produced from the system when a fingerprint matches a particular reference fingerprint. In a simple implementation, the preferred embodiment returns a pass signal (along with a quality signal measuring a correspondence of the match) when a local ridge information of a fingerprint-under-test sufficiently matches corresponding local ridge information of a candidate reference fingerprint.

Figure 1:
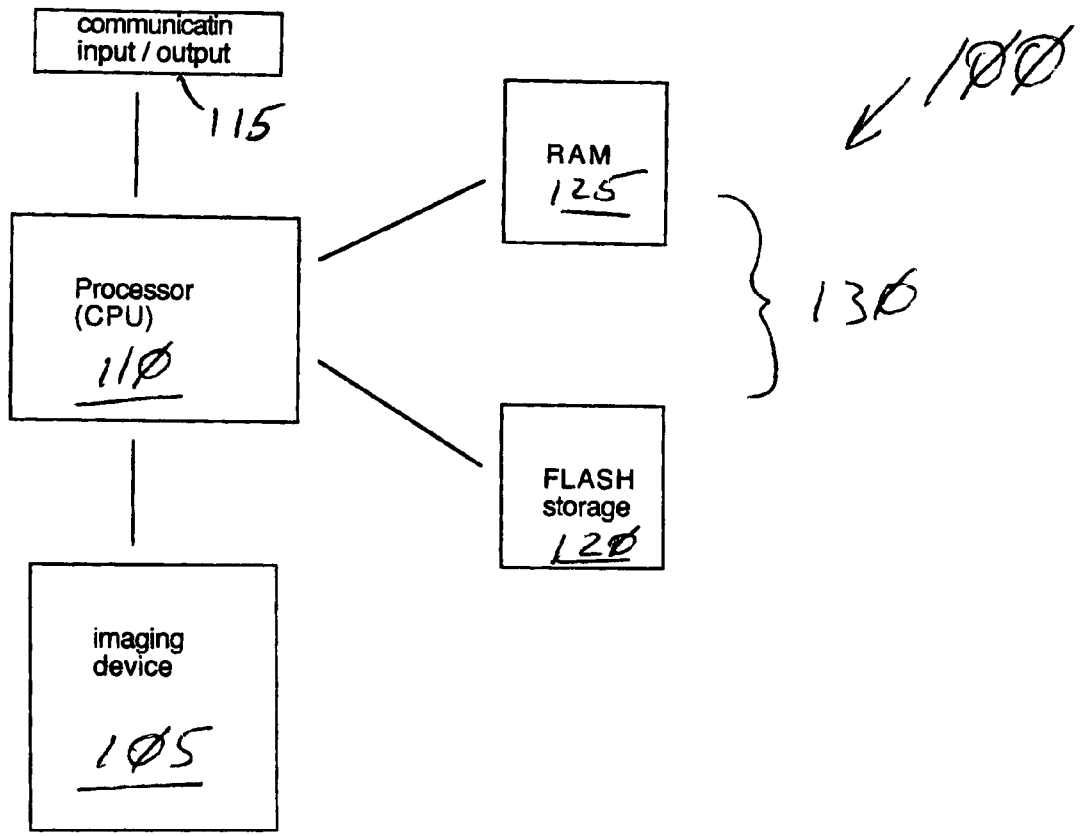
FIG. 1 is a block schematic diagram of a preferred embodiment for a fingerprint verification system.

FIG. 1 is a block schematic diagram of a preferred embodiment for a fingerprint verification system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the preferred embodiment, as fingerprint verification system as opposed to other type of fingerprint checking/matching system. In a fingerprint verification system, the system attempts to measure a correspondence between a test fingerprint and reference fingerprints (one-on-one) in order to confirm identify of the test to the reference database. This is contrasted with an identification system that determines which reference the test has been matched to. Typically, a verification system may be used as an identification system if a decrease in power/speed is acceptable, given analogous resources.

System 100 may function as a basic computer in implementing the present invention for accessing and processing fingerprints, fingerprint images, and ridge maps as further described below. Processor 110 may include one or more central processing units (CPUs), such as one of the PC microprocessors or workstations, e.g. RISC System/6000 (RS/6000) (RISC System/6000 is a trademark of International Business Machines Corporation) series available from International Business Machines Corporation (IBM), is provided and interconnected to various other components, such as by a system bus.

Imaging device 105 produces an image of a fingerprint; either directly (i.e., it is a sensor) or it accesses a data structure or memory to obtain the image. The image may be of a reference fingerprint or of a fingerprint-under-test. System 100 is a general purpose computer having a large number of suitable implementations for accessing and processing resources fingerprints, fingerprint images, and ridge maps. Sensors that may be used with system 100 include charge-coupled devices (CCD), complementary metal oxide semiconductor (CMOS), capacitive, or other image sensing devices, such as those available from Fujitsu, Atmel, Athentec, and ST Micro for example. Image arrays may be relatively small (e.g., 128×128 pixels to a more common CIF size of 352×288 pixels or larger), each pixel having a pixel depth of but not limited to eight bits. System 100 uses a fingerprint image produced from source 105. In some cases, system 105 may preprocess images, such as performing image keystone corrections (a geometric correction used to account for optical distortions associated with optical/prism based systems when returning an image size proportionate to fingerprint size or image stitching to assemble an image taken in bands as a finger is 'swiped' across the sensor.

An operating system runs on processor 110, providing control and coordinating the functions of the various components of the system. The operating system may be one of the commercially available operating systems such as the AIX 6000 operating system or OS/2 operating system available from IBM (AIX 6000 and OS/2 are trademarks of IBM); Microsoft's Windows, Apple's MacOS, as well as UNIX and AIX operating systems, though the preferred embodiment uses a custom control for providing minimal, tailored functions. Custom programs, controlled by the system, are moved into and out of memory. These programs include the program of the present invention to be subsequently described in combination with analyzing and comparing fingerprint-related data. Source 105, I/O communication system 115, and memory system 130 is coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring images, maps, instructions or programs.

In use, system 100 compares a live finger to a known database in memory 130. The databases of conventional system typically includes one reference from each finger. The preferred embodiment stores multiple references from each finger. When comparing a live finger against the database, system 100 sets the security level higher then for a one to one correspondence and tests the live finger against multiple references from the same finger. System 100 compares reference maps from the same fingerprint against each other using heightened security, and compares maps from one finger against other references supposedly from other fingers to verify that a finger is not referenced multiple times (though each finger has multiple maps).

For example; if two references are stored for a given finger using a false accept rate of 1/2,000, then testing a live finger against the two stored references effectively accomplishes a final false accept rate of 1/1,000.

An advantage in doing so is that the system's false reject rate falls well below a level of other conventional systems, e.g. a 1/100 claimed by many conventional algorithms). Empirically, for example; at a false accept rate of one in 1,000, system 100 has a false reject rate of 1 percent. At a false accept rate of one in 2,000, system 100 has a false reject rate of 1.1 percent. At a false accept rate of one in 10,000 system 100 has a false reject rate of 1.5 percent. At a false accept rate of one in 100,000, system 100 has a false reject rate of 2 percent.

While other algorithms claim a low FRR at the 1/1000 FAR, system 100 maintains a relatively low FRR as FAR goes to 1/10000 to 1/1000000 and beyond, making system 100 operate in a relatively flat portion of a FRR/FAR curve.

System 100 has an advantage not necessarily in processing database statistics, but an advantage in actual use. System 100 stores more templates for each user and sets its test methods to a higher FAR, system 100's ability to successfully match live fingers against stored references is much better than measured statistics and much better than what other conventional algorithms do. It is better than measured statistics partially because known database samples are too limited to test the performance, being established for conventional systems.

Figure 2:
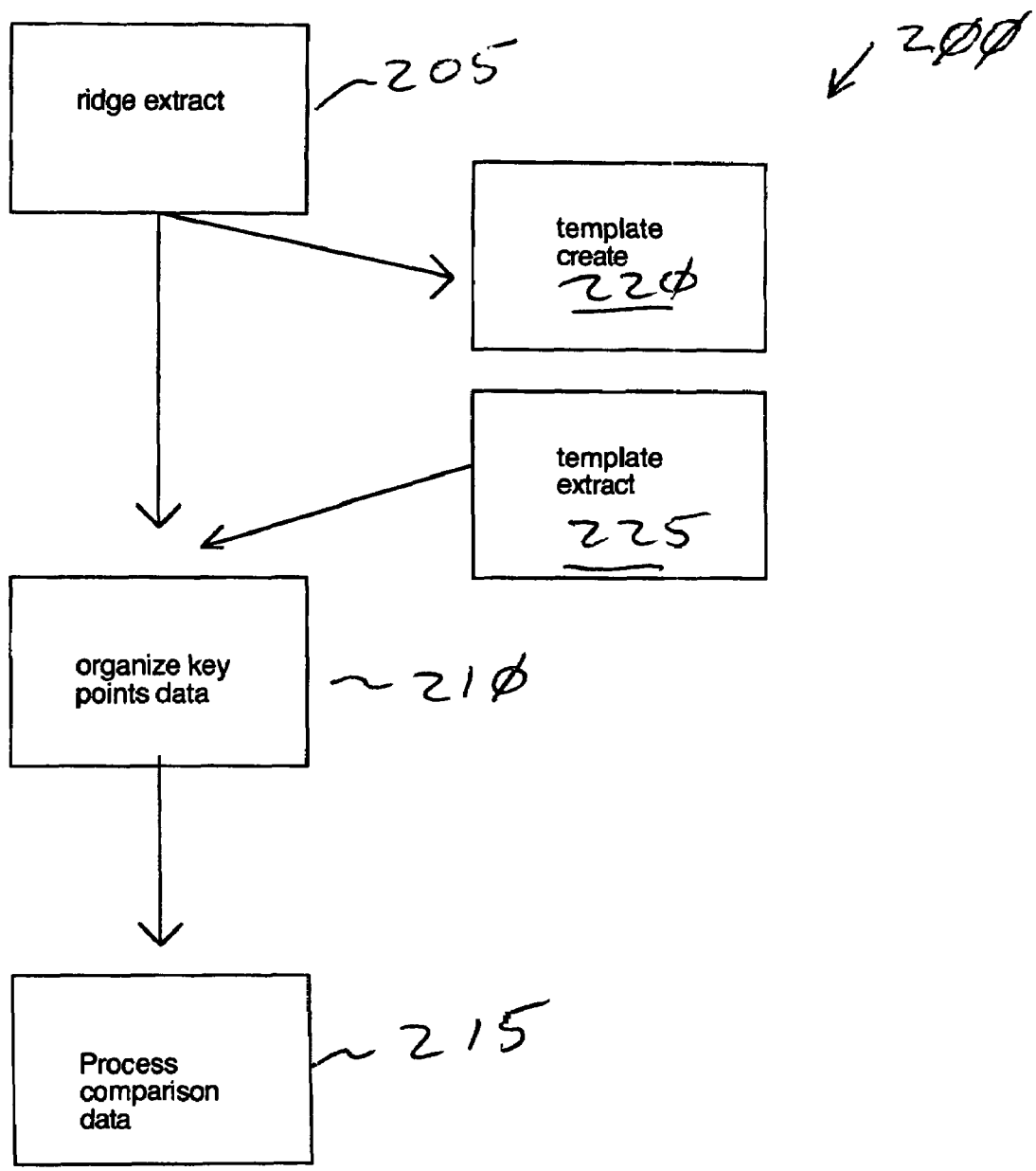
FIG. 2 is a flow diagram of a preferred embodiment for a fingerprint verification process.

FIG. 2 is a flow diagram of a preferred embodiment for a fingerprint verification process 200. Process 200, executed by system 100 for example, includes three main subprocesses: step 205 is a ridge extraction process; step 210 is an organize key points data subprocess following step 205; and step 215 is a compare data subprocess following step 210. Process 200 preferably also includes template processing steps: a template create step 220 and a template extraction step 225.

System 100 uses much of the available ridge data for image comparison. Preparation for comparison is step 205 while actual image verification has two basic steps: organize step 210 and compare step 215.

Ridge extraction step 205 creates a ridge map from an image. There are many ways that an image may be processed to produce the ridge map, some of which are dependent upon the type of sensor, type of image, and resources of system 100. In the preferred embodiment, reference images produced from sensor 105 have ridge maps extracted and templates made from the maps are stored efficiently into memory system 130 as encrypted templates for security and efficient use of memory. When the references are stored as templates, system 100 produces appropriate ridge maps from the templates for use. Reference ridge maps and/or templates from the reference ridge maps are stored in FLASH memory 120 for long term storage, and moved into RAM 125 for processing.

In general, just as one would with an image on a piece of paper, process 205 overlays one image buffer on top of an original image for the extracted ridge data. (the overlay buffer may actually be a multiple of source image. For example: the overlay may be a 2:1 ratio in size.) Step 205 steps across the image array looking for a ridge element to follow. Upon finding a ridge element, step 205 follows it in both directions (most probably the starting point is not a ridge end point). Step 205 "draws" an image of the ridge on the overlay image buffer pixel by pixel. Step 205 repeats stepping across the image array looking for new ridges. The preferred embodiment for step 205 employs a 'ridge following' technique. Many conventional fingerprint systems employ a Fast Fourier Transform (FFT) or other mathematical smoothing model followed by a ridge thinning process. With the ridge following method, step 205 bypasses the processor intensive FFT and the ridge thinning steps.

There are many systems for extracting ridge data from an image. For the preferred embodiment, the ridge extraction is the ridge following process. Details of the ridge following system are disclosed in the related patent application incorporated herein. System 100 uses a ridge following technique because: (a) faster image processing; (b) ability to define ridges with very little ridge to valley definition; (c) eliminates ridge thinning step; and (d) self healing of cracks and gaps.

While the preferred embodiment anticipates that other ridge map formation processes are possible, it is preferable that ridge map formation be compatible between ridge map formation of reference ridge maps and a ridge map from an image of a fingerprint-under-test. It may be that the only sufficiently compatible processing will be achieved using virtually the same mapping for the test image as the reference image(s). However, it may not be a requirement for successful operation for all implementations and embodiments.

Figure 3:
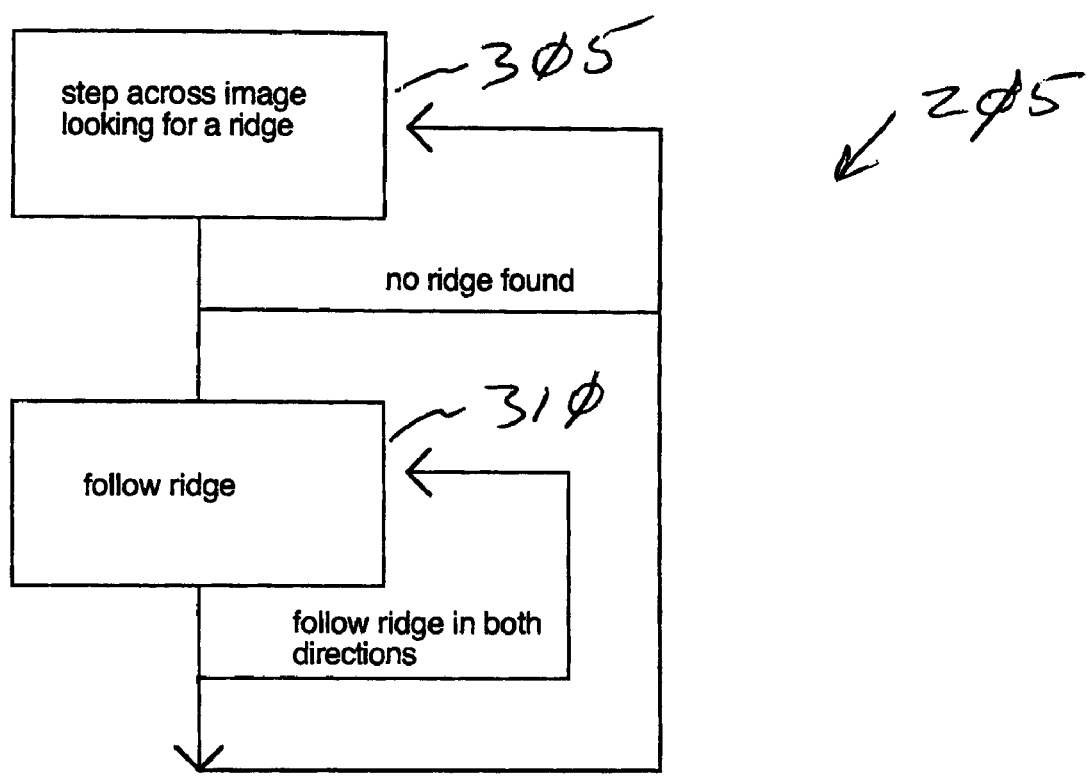
FIG. 3 is a flow diagram for a preferred embodiment of the ridge map formation subprocess 205 shown in FIG. 2.

FIG. 3 is a flow diagram for a preferred embodiment of the ridge map formation subprocess 205 shown in FIG. 2. Subprocess 205 includes two steps: a ridge location step 305 and a ridge follow step 310.

Figure 4:
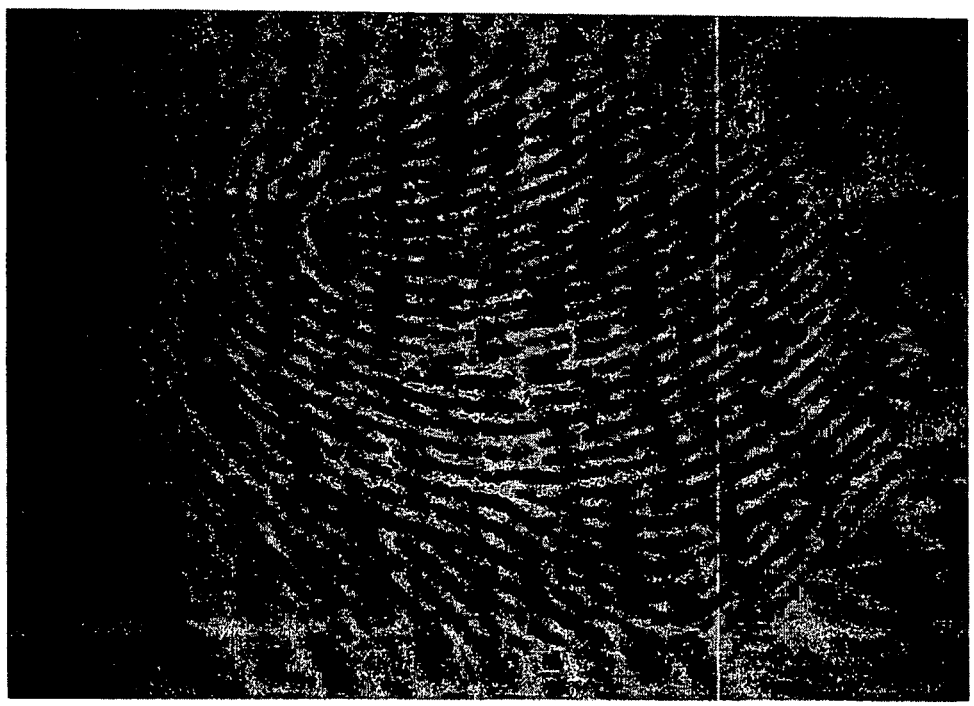
FIG. 4 is an image typical of an output from a fingerprint sensor.

FIG. 4 is an image 400 typical of an output from a fingerprint sensor, and of the type from which system 100 creates a ridge map. Ridge/furrow amplitude information is presented in eight-bit grayscale, with white having a value of "255" and black having a value of "0." Many parts of a ridge element will have values greater than or equal to 0, while furrows will have values less than or equal to 255. The ridge map production is important to both accurately and reproducibly generate ridge maps from fingerprint images. The ridge maps have feature points of interest that are typically endpoints of a ridge element. These features are important in screening, matching, and verifying, so reproducibility is important. A preferred embodiment for ridge map production introduces extra feature points of interest, such as when ridge elements merge or intersect, the ridge map will include an endpoint near the point of merger or intersection rather than simply join the ridge element lines.

Figure 5:
FIG. 5 is a ridge map extracted from the image shown in FIG. 4.

FIG. 5 is a ridge map 500 extracted from image 400 shown in FIG. 4. Map 500 is a binary map in which ridges are depicted as black pixels and non-ridges as white pixels. Map 500 is qualified by system 100 to ensure that it contains a sufficient amount of identifiable data in proper proportion to be able to securely use the map for verification. Map 500 may be scaled from the original image size to reduce memory requirements while potentially sacrificing some accuracy. Map 500 is shown at a ratio of 1:1 with image 400.

FIG. 6 is a set of representative ridge cross-sections, including FIGS. 6a., 6b., and 6c. showing typical ridge cross sectional areas as represented in numerical data as seen by subprocess 205. Note the valley-ridge-valley data from the sensor may be represented with either ridges or valleys having a zero value. Subprocess 205 processes the data with ridges having values tending toward a zero value and valleys tending toward a 255 value. When the source image (e.g., image 400) is otherwise, subprocess 205 reverses the values.

FIGS. 6a., 6b., and 6c. also show a significant characteristic of human fingerprints that must be accounted for in ridge processing: namely that ridges have varying widths, heights, depths and various discontinuities (e.g., a minor valley in FIG. 6c. created by a ridge pore or ridge artifact) that are most notably observed in cross section with wider ridges.

While the present invention is applicable to images that represent other types of contrasting amplitude elements having numerous continuous pixel-to-pixel features, ridge location and ridge following of the preferred embodiment are tuned to mapping human fingerprints. The tuning occurs through characterizing parameters of ridges and relationships among neighboring ridges. The tuning therefore makes certain assumptions and constrains image mapping to produce map 500. When operating on map 500, knowledge of the extraction parameters and nature of the fingerprint ridge map is important to optimally implement some map processing features, such as the compression/decompression of map templates as set forth in the incorporated patent applications.

For example, the fingerprint ridge maps used in the preferred embodiment define fingerprint ridges as follows: the ridge elements of map 500 are one pixel wide, have a minimum length of (usually 12-16) pixels, have a minimum separation of 1 pixel between ridges, a maximum rate of curvature of a ridge element is (usually 12) degrees/one pixel step, a ridge element pixel is immediately adjacent to at most two other ridge pixels, and a ridge does not intersect or merge into another ridge (in the preferred embodiment, end-of-ridges are substituted for merging/intersecting ridges). Of course, other parameters, in addition to or in lieu of, these parameters may be used in other implementations or for other data structures, and these values may be adjusted as necessary or desirable for specific implementations.

Map formation subprocess 205 examines image 400 to produce map 500. Step 305 moves through the data structure representing image 400 looking for a ridge to follow. Upon finding a ridge, step 310 follows the ridge in both directions (most probably the starting point is not a ridge end point). Step 305 and 310 are repeated until the entire image data structure is analyzed and map 500 is produced from image 400.

Step 310 is a 'ridge following' technique, while other systems employ an FFT (Fast Fourier Transform) or other mathematical smoothing model to image 400 and follow the model with a ridge thinning process (i.e., a "width" of a represented ridge is decreased as opposed to removing ridges). Step 310 bypasses the processor intensive FFT/modeling and the ridge thinning steps. Step 310 offers the advantages of faster image processing; an ability to define ridges with very little ridge to valley definition in image 400; eliminates a requirement for any ridge thinning step; and step 310 self-heals "cracks" and "gaps" in a fingerprint image. Because the same ridge following techniques are applied to the reference images and to the test images, quick reproducible maps that are able to be quickly matched produce the desired result of image verification without requiring super-fidelity in generation of map 500 from image 400. However, map 500 produced from image 400 of the preferred embodiment is generally a very good exemplar of the fingerprint image. Built into system 100 is the recognition that the skin of the finger is malleable and susceptible to other distortions (swelling/shrinkage), so "matching" fingerprints may include certain ridge element deviations from one image to another.

Subprocess 205 uses an image buffer (a transparent buffer) as a transparency over an original image buffer containing image 400. The transparent buffer is used for the final ridge data map 500. The transparent buffer contains the final ridge output of a one pixel wide path containing the ridge located at the center of the original ridge. Conventional fingerprint systems generate this "ridge" by a line thinning process of a mathematical model output of image 400.

Step 305 advances across the image buffer looking for a ridge. Step 305 normally uses pixel steps of about one-half of the closest possible ridge-to-ridge distance. When a point of correct amplitude is found in the image buffer, the first part of step 305 first checks the transparent buffer to determine whether the pixel is part of a previously mapped ridge. When it has been mapped, the prospective ridge pixel is ignored. When no previous mapping includes the prospective ridge pixel, step 310 performs a detailed look at the image buffer location. The detailed look includes: (1) pixel prequalification, (2) check ridge path, and (3) check lateral parallel ridge-paths.

First, step 305 checks pixels within a small radius (usually one average ridge to ridge width) of the image point we are checking. This is done as a speed enhancement by checking the value of the points at a radius to determine whether there is enough data variation to merit a full ridge check (i.e., an area of image having generally uniform "color" will fail this initial check—such regions may exist at the periphery of image 400). A region with no ridge elements present will have little variation in image data.

Figure 7:
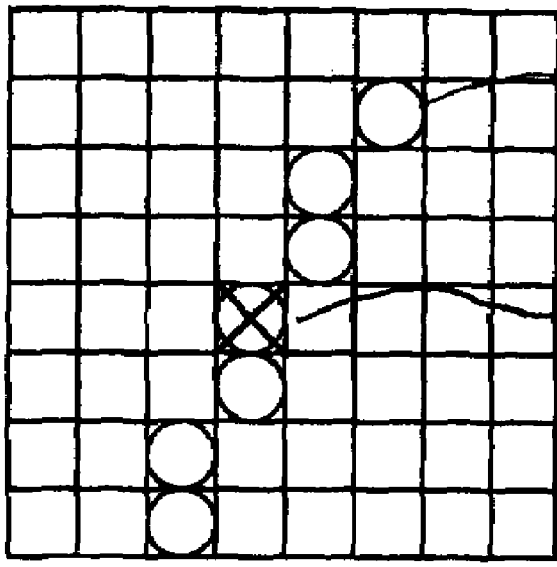
FIG. 7 is an illustration of linear path definition through a step point.

Second, step 305 checks for a ridge by collecting data along a linear path centered at the image buffer step point. FIG. 7 is an illustration of a linear path definition 705 (the squares with circles inside define the path in the example) through such a step point 710.

Figure 8:
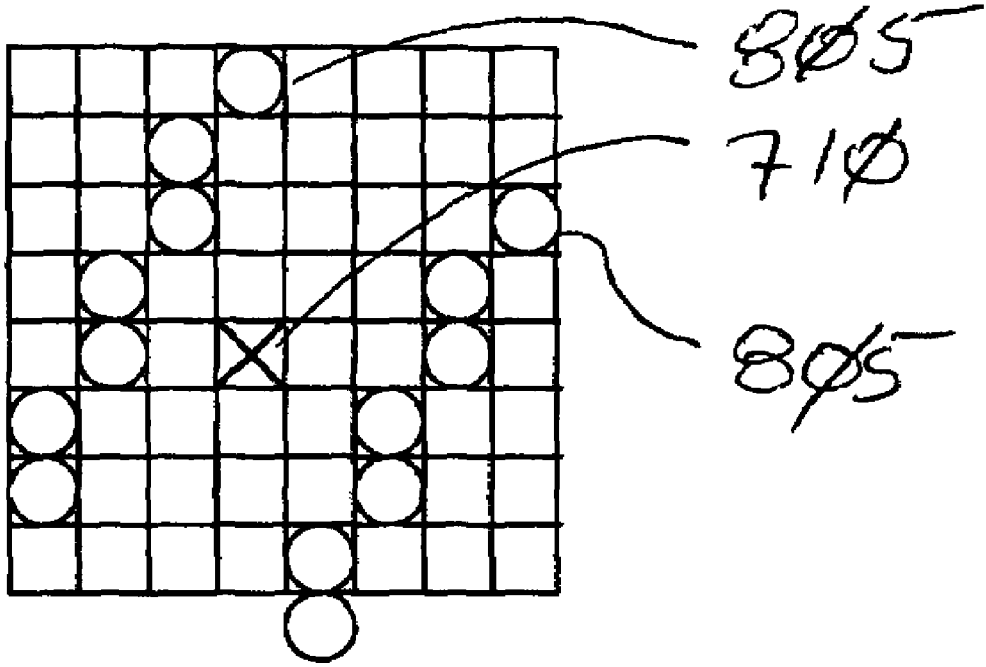
FIG. 8 is an illustration of one pair of parallel linear path definitions for the step point illustrated in FIG. 7.

Third, step 305 then collects data along the parallel linear paths at both sides of the linear path of the second part shown in FIG. 7. FIG. 8 is an illustration of one pair of parallel linear path definition. This third part effectively collects an image cross section mapped by collecting parallel paths of image data with the center of the map containing the linear path collected using the image array step point. Successive parallel paths are collected, at ever increasing lateral distance, with the effect of straddling a peak (ridge) by locating lateral valleys (furrows).

Ridges have a distinct hill, valley, hill profile when viewed in cross section. Step 305 assesses the magnitude of the hill, valley, hill profile by searching equal distance from the center the profile data until the hill, valley, hill data become valley, hill, valley, hill, valley.

Step 305 next increments an angle of the ridge search and performs the ridge check again until subprocess 205 has searched angles ranging from zero through one hundred eighty degrees. At each angle step 305 evaluates the collective cross-sections for a strongest magnitude of hill, valley, hill data. The angle having the corresponding greatest magnitude becomes the angle of the probable ridge element at the image array step point. This cross-sectional area analysis is the bases for a FFT-like model without the math of the FFT.

Once a potential ridge point is qualified by the three parts of step 305, subprocess 205 performs an additional analysis before following the potential ridge point. Since step 305 has stepped across the image buffer, the potential ridge point might not be centered on the ridge or step 305 may not have the exact ridge angle so step 205 follows the ridge several steps in one direction, turns around, records the position, follows the prospective ridge back past the initial point and continues an equal number of steps from the initial point as from where the process reversed itself. (I.e., move m steps of size n from the initial point, turn, move back m steps to the initial point and continue m more steps.) Next, step 305 reverses itself again, follows the ridge back toward the initial point and m number of steps past again, reverses itself and records this new location. Finally, step 305 follows the ridge back toward the initial point and stops. When the location first recorded is within an acceptable radius of the second recorded location and step 305 finds its way back to the initial point, step 305 has found a good ridge and proceed to step 310, otherwise step 305 looks for a new ridge starting point. In the preferred embodiment, m is equal to about 4-6 steps and n is equal to about 2 pixels, though other implementations may have different values for m and/or n.

Moving back and forth along the potential ridge provides at least the following features: (1) it finds the correct ridge center and angle, and (2) it verifies that it is in fact a verifiable ridge by collecting data points at each end path traversed and that upon repeating the process subprocess 205 returns to the same location (a non-ridge will not return to the same location).

Step 310 next follows the ridge. Since step 310 most often starts somewhere mid-ridge, step 310 is prepared to follow the ridge in both directions. A ridge is followed by moving a small unit of distance in the direction of the ridge angle last determined. Step 310 looks ahead from the test location in this manner p steps of q unit forward, with p equal to about 4-6 pixels and q equal to about 2 pixels in the preferred embodiment (though other implementations may have different values for p and/or q.

From p steps forward step 310 reverses and follows the ridge back towards the test location and arrives at a first sample location. When the first sample location is suitably close to the test location, step 310 has found a good ridge and the proper ridge direction and advances one mapping step. The location at the end of the mapping step is the new test location and step 310 repeats, looking forward, and then following the ridge back to a new sample location and compares that the new test location.

Looking forward from a test location and then following the ridge back to the sample location for comparison is a significant reason why following a ridge is possible. A problem in following a ridge is the presence of a 'Y,' a branch in the ridges, or other intersection event that will later be used to form a point of interest. The other need is to determine ridge endpoints. By moving forward and then following the ridge back, a 'Y' will not be traversed the same forwards as backwards across the 'Y' and therefore will yield an unsuitable close location result. Similarly, endpoints will not be able to return to the same location thereby signaling an end of ridge. Thus, ridge endpoints are created at each point when the forward and backward path do not match, such as at these intersection events, rather than continuing the ridge map through the intersection.

A reason a 'Y' cannot be traversed in both directions is because in one direction a single ridge (or branch) will be followed but in the return direction valleys will surround the trunk which will split into two branches with a valley between. The ridge width will grow and step 310 detects both that the center of the ridge does not align moving forward and backward and step 310 flags a valley between the ridge branches. An advantage in this is step 310 follows ridges with very little definition between ridge and valleys (e.g., low contrast images).

The following discussion explains details of the preferred embodiment in following a ridge. Other implementations may use other ridge following processes. Just as in looking for a ridge start point, to follow a ridge step 310 uses a cross sectional profile extending in the direction of the last known ridge section (behind the current point). Step 310 also records, from the ridge start and every step taken, the width of the ridge so step 310 knows the last valley-to-valley width. Subprocess 205 assumes continuity and expects the ridge in front to have similar dimensions. Step 310 looks for valleys near the previous valleys and the ridge near the previous ridge in each new cross sectional profile.

Step 310 examines the new profile for new valley location and ridge location by observing the maximums for the valley and ridge data in the cross section info. Additionally, step 310 looks for mid points in the ridge to valley profile to provide an 'area under the curve' in addition to local minimum and maximum (an math-free (i.e., lower processing requirements) FFT). Step 310 also watches for a valley appearing in the mid ridge region. Using the valley-ridge-valley profile, step 310 looks for a shift in the center of the valley-to-valley data. When the two valleys are no longer centered, step 310 adjusts the angle (direction) in which the ridge is progressing.

By repeating these elements, step 310 moves along the ridge. There are considerations in the preferred embodiment that are addressed for ridge following to work satisfactorily. When moving along a ridge, step 310 always takes a profile of the data ahead of the test location, not of the data of the test location. Similarly to walking or piloting a vehicle, operators do not typically look to their feet or the area below their current location, rather the operators look ahead to make adjustments as path variations occur, step 310 looks ahead in following a ridge. This feature is one reason that system 100 is able to extract ridge elements and span cracks or other discontinuities, a form of "self-healing" for system 100.

It is a feature of the preferred embodiment to be effective using embedded system resources that typically include components with computer power having less raw processing ability than available in many general purpose computing systems. To achieve this result, process 200 strives to relieve system 100 of computationally intensive tasks. The discussion of process 200, except in theoretical terms, does not mention specific math functions. System 100 includes one very small (32 element) table of predefined trigonometric data for look-up rather than calculation. While process 200 could be accomplished to the same end with constant calculations using extensive trigonometry and calculus, process 200 accomplishes its processing with just simple additions. The most processor intensive aspect of process 200 is all of the data that must be read from the original image.

The target processor has very little processing power or memory in comparison to a desktop computer. The described specifics of process 200 "hide" the math so completely to reduce computing power requirements to a level that the prior art solutions are not able to do achieve similar accuracy using similar resources.

During the previous discussion, the terms "nearest neighbor" and "pixel-to-pixel transition" are used. To simplify the discussion, these terms are defined in terms of a data structure representing a regular data matrix having a number of regular, parallel, and adjacent rows and columns (though the data matrix is typically not square). In this representation, pixels may be located at any of the locations of the matrix. Any interior location has eight immediately adjacent pixel locations: four diagonal locations and four non-diagonal (e.g., above, below, left, and right). Exterior pixel locations will have fewer than eight. These immediately adjacent possible pixel locations to any reference pixel location are the "nearest neighbors" for this data structure representation. In some implementations, data structures may have a different representation with a different structure that may have more or fewer nearest neighbors, physical or logical.

When at a reference pixel location, there are rules defining the possible (theoretical and/or the actual) directions to valid "nearest neighbor" pixel locations. In other words, when at an endpoint of a ridge element, there are eight nearest neighbors. There are theoretically, for an interior endpoint, eight possible pixel-to-pixel transitions of the ridge element extending from the reference location. For non-endpoint reference pixels, the theoretical maximum number of pixel-to-pixel transitions is dependent upon some of the predetermined relationships (discussed above) among the ridge element pixels of any particular ridge and the pixel location immediately preceding the reference pixel. Without limitation, non-endpoint pixels have a maximum of seven possible directions. If one uses the parameters identified above (except for a maximum path curvature check), then there are a maximum of five possible pixel-to-pixel transitions for a diagonal adjacency between the preceding pixel location and the reference location. There are a maximum of three possible pixel-to-pixel transitions for a non-diagonal adjacency.

When considering the maximum turning radius parameter, there are a maximum of three pixel-to-pixel transitions for both diagonal and non-diagonal adjacency. This information, combined with recognizing that, for ridge elements of a fingerprint, an actual pixel transition direction from a reference location has a highest probability of continuing in the same direction as from the preceding pixel location to the reference location.

One of the preferred implementations of the present invention is as a routine in an operating system made up of programming steps or instructions resident in a memory of a computing system shown in FIG. 1, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, C#, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed is:

1. A method for processing an image data structure, using a processor or a computing system, to extract a feature defined by a plurality of contiguous data elements, the method comprising:

identifying, using the processor or the computing, a set of candidate image feature pixels, said set including one or more pixels from the image data structure;

examining, using the processor or the computing, local image data surrounding one or more pixels of said set of candidate image feature pixels to identify a set of potential image feature pixels with each of said potential image feature pixels having a characteristic consistent with being associated with the feature; and identifying, using the processor or the computing, the feature in said image data using said set of potential image feature pixels by locating one or more of the plurality of contiguous data elements neighboring one or more pixels of said set of potential image feature pixels.

2. The method of claim 1 wherein the feature is a fingerprint ridge and the image data structure represents an image of a fingerprint.

3. The method of claim 2 wherein said candidate set identifying step periodically samples pixels of the image data structure.

4. The method of claim 3 wherein said data structure represents a matrix of columns and rows and said periodic sampling includes every nth pixel in a row, where n is a positive integer.

5. The method of claim 1 wherein said examining step checks for a feature transition.

6. The method of claim 5 wherein the feature is a fingerprint ridge and the image data structure represents an image of a fingerprint.

7. The method of claim 6 wherein each said candidate image feature pixels have a numeric value associated with its correspondence to said characteristic.

8. The method of claim 7 wherein said examining step quantifies said numeric values of sets of neighboring image pixels, each set containing pixels of a particular distance from said examined one or more pixels, a plurality of sets of neighboring image pixels having different ones of said particular distances.

9. The method of claim 6 wherein said feature transition is a furrow-to-furrow distance separated by said fingerprint ridge.

10. The method of claim 9 wherein said examining step quantifies said numeric values of sets of neighboring image pixels, each set containing pixels of a particular distance from said examined one or more pixels ranged over said furrow-to-furrow distance, a plurality of sets of neighboring image pixels having different ones of said particular distances.

11. The method of claim 1 wherein said feature identifying step includes following the feature using said characteristic at one or more of the plurality of contiguous data elements.

12. The method of claim 1 wherein the plurality of contiguous data elements define a pattern.

13. The method of claim 12 wherein said pattern is a contrasting amplitude map.

14. The method of claim 13 wherein said map is from a human appendage.

15. The method of claim 14 wherein said map includes ridge-furrow data.

16. The method of claim 13 wherein said map includes a plurality of irregular proximal contrast elements.

17. An apparatus for processing an image data structure to extract a feature defined by a plurality of contiguous data elements, the apparatus comprising:

means for identifying a set of candidate image feature pixels, said set including one or more pixels from the image data structure;

means for examining local image data surrounding one or more pixels of said set of candidate image feature pixels to identify a set of potential image feature pixels with each of said potential image feature pixels having a characteristic consistent with being associated with the feature; and means for identifying the feature in said image data using said set of potential image feature pixels by locating one or more of the plurality of contiguous data elements neighboring one or more pixels of said set of potential image feature pixels.

18. An apparatus for forming a data structure from an image having a first plurality of sets of image elements with one or more predetermined relationships among the image elements and among the sets, the apparatus comprising:

a memory; and a processing unit, coupled to said memory, for:

identifying a set of candidate image feature pixels, said set including one or more pixels from the image data structure;

examining local image data surrounding one or more pixels of said set of candidate image feature pixels to identify a set of potential image feature pixels with each of said potential image feature pixels having a characteristic consistent with being associated with the feature; and identifying the feature in said image data using said set of potential image feature pixels by locating one or more of the plurality of contiguous data elements neighboring one or more pixels of said set of potential image feature pixels.

19. The apparatus of claim 18 wherein the feature is a fingerprint ridge and the image data structure represents an image of a fingerprint.

20. The apparatus of claim 19 wherein said candidate set identifying step periodically samples pixels of the image data structure.

21. The apparatus of claim 20 wherein said data structure represents a matrix of columns and rows and said periodic sampling includes every about nth pixel in a row, where n is a positive integer value of three through six.

22. The apparatus of claim 18 wherein said examining step checks for a feature transition.

23. The apparatus of claim 22 wherein the feature is a fingerprint ridge and the image data structure represents an image of a fingerprint.

24. The apparatus of claim 23 wherein each said candidate image feature pixels have a numeric value associated with its correspondence to said characteristic.

25. The apparatus of claim 24 wherein said examining step quantifies said numeric values of sets of neighboring image pixels, each set containing pixels of a particular distance from said examined one or more pixels, a plurality of sets of neighboring image pixels having different ones of said particular distances.

26. The apparatus of claim 23 wherein said feature transition is a furrow-to-furrow distance separated by said fingerprint ridge.

27. The apparatus of claim 26 wherein said examining step quantifies said numeric values of sets of neighboring image pixels, each set containing pixels of a particular distance from said examined one or more pixels ranged over said furrow-to-furrow distance, a plurality of sets of neighboring image pixels having different ones of said particular distances.

28. The apparatus of claim 18 wherein said feature identifying step includes following the feature using said characteristic at one or more of the plurality of contiguous data elements.

29. The apparatus of claim 18 wherein the plurality of contiguous data elements define a pattern.

30. The apparatus of claim 29 wherein said pattern is a contrasting amplitude map.

31. The apparatus of claim 30 wherein said map is from a human appendage.

32. The apparatus of claim 31 wherein said map includes ridge-furrow data.

33. The apparatus of claim 32 wherein said map includes a plurality of irregular proximal contrast elements.

34. A computer program product including a computer readable medium carrying program instructions for processing an image data structure to extract a feature defined by a plurality of contiguous data elements when executed using a computing system, the executed program instructions executing a method, the method comprising:
    identifying a set of candidate image feature pixels, said set including one or more pixels from the image data structure;
    examining local image data surrounding one or more pixels of said set of candidate image feature pixels to identify a set of potential image feature pixels with each of said potential image feature pixels having a characteristic consistent with being associated with the feature; and
    identifying the feature in said image data using said set of potential image feature pixels by locating one or more of the plurality of contiguous data elements neighboring one or more pixels of said set of potential image feature pixels.

35. The computer program product of claim 34 wherein the feature is a fingerprint ridge and the image data structure represents an image of a fingerprint.

36. The computer program product of claim 35 wherein said candidate set identifying step periodically samples pixels of the image data structure.

37. The computer program product of claim 36 wherein said data structure represents a matrix of columns and rows and said periodic sampling includes every nth pixel in a row, where n is a positive integer.

38. The computer program product of claim 34 wherein said examining step checks for a feature transition.

39. The computer program product of claim 38 wherein the feature is a fingerprint ridge and the image data structure represents an image of a fingerprint.

40. The computer program product of claim 39 wherein each said candidate image feature pixels have a numeric value associated with its correspondence to said characteristic.

41. The computer program product of claim 40 wherein said examining step quantifies said numeric values of sets of neighboring image pixels, each set containing pixels of a particular distance from said examined one or more pixels, a plurality of sets of neighboring image pixels having different ones of said particular distances.

42. The computer program product of claim 39 wherein said feature transition is a furrow-to-furrow distance separated by said fingerprint ridge.

43. The computer program product of claim 42 wherein said examining step quantifies said numeric values of sets of neighboring image pixels, each set containing pixels of a particular distance from said examined one or more pixels ranged over said furrow-to-furrow distance, a plurality of sets of neighboring image pixels having different ones of said particular distances.

44. The computer program product of claim 34 wherein said feature identifying step includes following the feature using said characteristic at one or more of the plurality of contiguous data elements.

45. The computer program product of claim 34 wherein the plurality of contiguous data elements define a pattern.

46. The computer program product of claim 45 wherein said pattern is a contrasting amplitude map.

47. The computer program product of claim 46 wherein said map is from a human appendage.

48. The computer program product of claim 47 wherein said map includes ridge-furrow data.

49. The computer program product of claim 46 wherein said map includes a plurality of irregular proximal contrast elements.

* * * * *